United States Patent [19]
Hortensius et al.

[11] Patent Number: 5,917,629
[45] Date of Patent: Jun. 29, 1999

[54] TRANSCEIVER FOR EXTENDING A CSMA/CD NETWORK FOR WIRELESS COMMUNICATION

[75] Inventors: Peter Dirk Hortensius, Goldens Bridge; Haaken B. Winbom, White Plains, both of N.Y.

[73] Assignee: International Business Machines Corporation, Armonk, N.Y.

[21] Appl. No.: 07/605,052

[22] Filed: Oct. 29, 1990

[51] Int. Cl.⁶ ..................................................... H04J 14/08
[52] U.S. Cl. .......................................... 359/136; 359/172
[58] Field of Search ..................................... 359/113, 114, 359/124, 125, 135, 136, 137, 140, 152, 153, 161, 158, 165, 172, 123; 370/85.2, 85.3, 94.1

[56] References Cited

U.S. PATENT DOCUMENTS

| | | | |
|---|---|---|---|
| 4,646,293 | 2/1987 | Okada et al. | 370/85 |
| 4,665,519 | 5/1987 | Kirchner et al. . | |
| 4,751,701 | 6/1988 | Roos et al. | 359/136 |
| 4,807,222 | 2/1989 | Amitay . | |
| 4,809,257 | 2/1989 | Gantenbein et al. . | |
| 4,975,926 | 12/1990 | Knapp | 359/159 |
| 5,029,183 | 7/1991 | Tymes | 315/1 |
| 5,060,303 | 10/1991 | Wilmoth | 359/152 |

FOREIGN PATENT DOCUMENTS

| | | | |
|---|---|---|---|
| 0093623 | 9/1983 | European Pat. Off. | H04L 11/16 |
| 0097309 A3 | 1/1984 | European Pat. Off. | H04L 11/20 |
| 0257947 A2 | 3/1988 | European Pat. Off. | H04L 11/16 |
| WO 88/07794 | 10/1988 | WIPO . | |

OTHER PUBLICATIONS

Fritz R. Gfeller and Urs Bapst, Wireless In–House Data Communication via Difussed Radiation Nov. 1979.
"Infrared Microbroadcasting Network for In–House Data Communication" by F. Gfeller IBM Technical Disclosure Bulletin vol. 24, No. 8 Jan. 1982.
Tokoro et al., "Acknowledging Ethernet", Fall meeting Digest of Papers from COMPCON IEEE Computer Society international conference, Conf. 15, U.S., New York, IEEE 1977 pp. 320–325.

*Primary Examiner*—Rafael Bacares
*Attorney, Agent, or Firm*—Perman & Green, LLP

[57] ABSTRACT

Apparatus and method for interfacing a wired communications network (12) to a wireless communications network (13). Both networks operate with a CSMA protocol. An interface unit (16) includes circuitry (28) for bidirectionally interfacing to the wired medium for transmitting messages thereto and for receiving messages therefrom. The interface unit also includes circuitry (29, 22, 24, 26) for bidirectionally interfacing to the wireless medium for transmitting messages thereto and for receiving messages therefrom. The interface unit further includes logic (28) for bidirectionally routing messages received from the wired medium to the wireless medium and for routing messages received from the wireless medium to the wired medium. A further feature of the interface unit is a collision detector (30), responsive to the reception of a rebroadcast wireless transmission, for comparing the transmitted message to the received rebroadcast message to determine if a collision has occurred.

18 Claims, 2 Drawing Sheets

TRANSCEIVER FOR EXTENDING A CSMA/CD NETWORK FOR WIRELESS COMMUNICATION

FIELD OF THE INVENTION

This invention relates generally to data communication apparatus and method and, in particular, to a transceiver for transparently coupling a wireless communication network to a Carrier Sense Multiple Access/Collision Detect (CSMA/CD) wired network.

BACKGROUND OF THE INVENTION

Portable computing using light-weight mobile data processors has become more pervasive as mobile data processors become more computationally powerful. However, with conventional practice use of the portable computer outside of an office or similar environment requires decoupling the portable computer from a network. This is due to current requirements for maintaining a wired connection when using computer networks.

Wireless communication between two points is well known and is typically accomplished using radio frequency (RF) communication techniques. An alternative for an indoor environment, such as an office building, is through the use of infrared (IR) radiation as a communication medium.

In IBM Technical Disclosure Bulletin Vol. 24 No. 8, 1982 F. Gfeller describes general control principles of an infrared wireless communication network incorporating multiple base stations and multiple mobile computers. Transmission occurs over the wireless IR medium using different frequencies for the uplink and the downlink but a single wavelength. This article does not discuss the issue of collision detection.

In U.S. Pat. No. 4,807,222, issued Feb. 21, 1989, N. Amitay discloses a wireless network using intelligent interfaces for each wired network connection. The interface is to a token bus network, not to a CSMA/CD network, thereby requiring that the wired and wireless networks be asynchronous from one another.

In U.S. Pat. No. 4,665,519, issued May 12, 1987, T. L. Kirchner et al., disclose a specific application using VHF FM radio as a means of connecting computers and computer peripherals. This patent describes in detail the implementation of an asynchronous access, token based protocol and does not address the issue of collision detection. Furthermore, the protocol appears to support only relatively low data rate communication and requires microprocessor control for each interface.

In International Patent WO88/07794, published Oct. 6, 1988, G. Vacon discloses the use of a wireless microwave bridge between two networks utilizing the CSMA/CD protocol. Vacon however does not consider a network interface for mobile computers to a CSMA/CD local area network. The interface is required to store messages before forwarding them to their destination and also does not address the problem of providing CSMA/CD on a wireless network involving many wireless devices. Collision detection occurs on the wired network but not on the wireless network.

One problem with the techniques presented by this prior art is that there is not provided a wireless network that is low in cost and that provides asynchronous multiple access with collision detection on the wireless network itself. The patents all operate with some variant of a "store and forward" mechanism, which adds complexity and cost to the overall system. The patents also consider networks employing synchronous access, peer to peer only, or asynchronous wired and wireless networks; and not a system wherein access is asynchronous for many users while also being synchronous with the wired network.

It is thus an object of the invention to provide for coupling a wireless communication network to a wired network that employs a CSMA/CD protocol.

It is a further object of the invention to provide a wireless network that utilizes separate wavelengths for an uplink and a downlink channel to facilitate the provision of collision detection on the wireless network.

It is a still further object of the invention to provide for a low complexity and low cost transceiver, and a method of operating same, for transparently coupling nodes of a wireless network to a standard, as opposed to a proprietary, local area wired network.

SUMMARY OF THE INVENTION

The foregoing and other problems are overcome and the objects of the invention are realized by a transceiver coupled to a wired CSMA/CD network and also coupled via a wireless medium to computers, including portable computers or workstations, equipped with wireless communication ports. The wireless medium is preferably within the infrared spectrum, although the teaching of the invention is also applicable to RF networks including microwave transmitters and receivers. In accordance with an aspect of the invention communication on an uplink channel, from portable computers to the transceiver, is accomplished at one wavelength while communication on a downlink channel, from transceiver to portable computers, is accomplished at a second wavelength. The use of two wavelengths allows for the simultaneous reception and transmission of data, an ability to repeat a message as the message is being received, and an ability to readily implement collision detection both on the wired network and on the wireless network. Communication on the wireless network occurs at the same bit rate and uses the same data packet structure as the wired network. Data packets going to and from the wired network are transferred at network speed and without requiring that the data be packetized. The invention provides an ability to incorporate a node or nodes coupled to the wireless network into the wired network in a transparent manner without requiring the transceiver to buffer message traffic or requiring the transceiver to incorporate an intelligent controller to manage message traffic.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
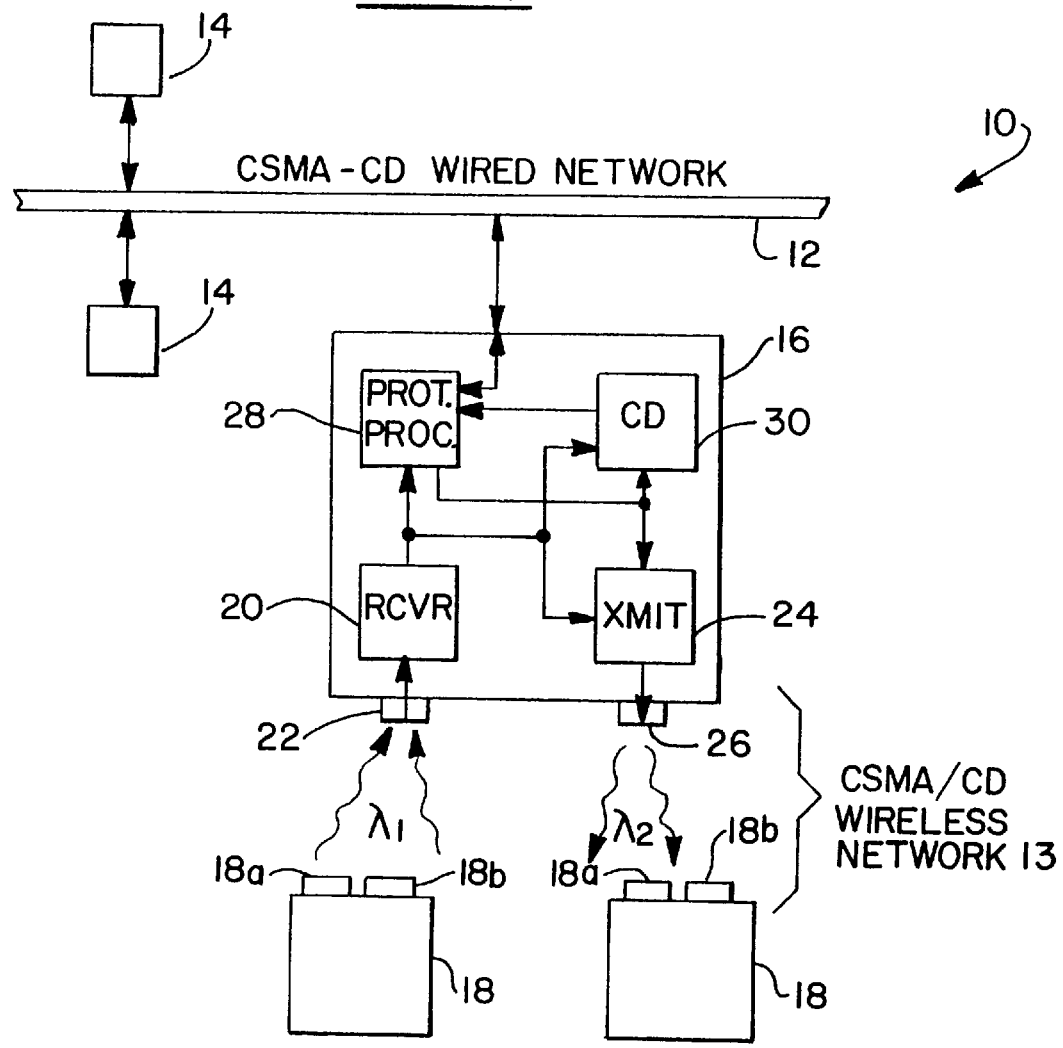
FIG. 1 is block diagram illustrating the transceiver of the invention coupled between a wired CSMA/CD local area network and a wireless network.

Referring first to FIG. 1 there is shown in block diagram form a CSMA/CD data communications network 10. Network 10 includes a wired network 12 and a wireless network 13. The wired network 12 conforms to a CSMA/CD protocol and may be embodied as an ETHERNET or similar network configuration. Coupled to the wired network 12 are one or more nodes 14. Nodes 14 may include data processors, network servers and/or any of a number of conventional devices. Also coupled to the wired network 12 is a transceiver 16 that is constructed and operated in accordance with the invention. As can be seen, the transceiver 16 functions as an interface between the wired network 12 and the wireless network 13. Although only one transceiver 16 is shown it should be realized that a plurality of same can be provided each having a coverage region that overlaps or does not overlap other transceivers. The wireless network includes one or more wireless nodes 18 which may be portable data processors, fixed data processors, printers or any of a number of devices commonly found coupled to a network.

Transceiver 16 includes a receiver (RCVR) 20 having an input coupled to a wireless medium receiving device 22. In a presently preferred embodiment of the invention the wireless medium is infrared (IR) radiation although in other embodiments of the invention the wireless medium may be radio frequency waves. The transceiver 16 also includes a transmitter (XMIT) 24 having an output coupled to a wireless medium transmitting device 26.

In accordance with an aspect of the invention the receiver 20 receives IR radiation on an uplink channel at a first wavelength $\lambda_1$ while the transmitter 24 transmits IR radiation at a second wavelength $\lambda_2$. By example, $\lambda_1$ and $\lambda_2$ have wavelengths associated with the near infrared portion of the electromagnetic spectrum, that is wavelengths above 700 nm. In one embodiment $\lambda_1$ is approximately 750 nm while $\lambda_2$ is approximately 850 nm. Receiving device 22 is comprised of an IR receiver, such as a photodiode, while the transmitting device 26 is comprised of an IR emitter such as an LED or laser diode.

The transmitted IR radiation may be modulated by any of a number of suitable techniques including but not limited to on/off keying, frequency shift keying (FSK), phase shift keying (PSK), amplitude modulation (AM) and frequency modulation (FM). Whatever modulation scheme is employed the receiver 20 comprises a corresponding demodulator for extracting digital information from the received IR radiation.

An output of the receiver 20 is provided to a CSMA/CD protocol processor (PROT. PROC.) 28 for application to the wired network 12. The protocol processor 28 includes driver and receiver circuitry suitable for interfacing to the wired network 12. The receiver 20 output is also applied to a collision detector (CD) 30. The operation of these two blocks is described in further detail below.

In accordance with another aspect of the invention the transceiver 16 repeats at the transmitter 24 all data received by the receiver 20. To this end the receiver 20 output is also coupled to the transmitter 24 such that demodulated digital data, received from a wireless node 18, is simultaneously employed to modulate the IR radiation and be rebroadcast. Each of the wireless nodes 18 also includes an IR receiver 18a and an IR transmitter 18b that operate at $\lambda_1$ and $\lambda_2$, respectively, and also include a collision detector unit.

Figure 2:
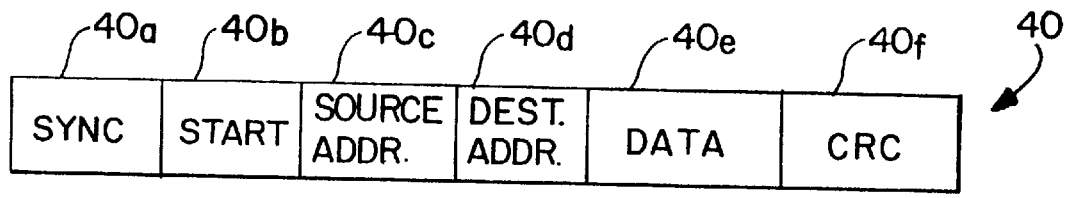
FIG. 2 illustrates a format of a packet of data that is bidirectionally transferred through the transceiver.

FIG. 2 illustrates an exemplary CSMA/CD data packet 40. It should be realized that the exact packet structure is a function of the network protocol in effect. Packet 40 includes a synchronization field (SYNC) 40a comprised of a repeating series of bits that the receiver 20 employs to establish synchronization with the serial bit stream. The SYNC field 40a is followed by a packet start delimiter 40b which is comprised of a predetermined bit sequence for defining the beginning of a message portion of the packet. The packet 40 also includes a source address field 40c and a destination address field 40d. The contents of the source address field 40c corresponds, typically, to the network address of the transmitting device while the destination address field 40d corresponds, typically, to the network address of the device to which the packet is being directed. In this regard the source address may be either one of the wired nodes 14 or one of the wireless nodes 18. The destination address may also be one of the wired nodes 14 or one of the wireless nodes 18. Thus, the packet 40 may be directed from a wired node 14 to another wired node 14 or, via the protocol processor 28 and transmitter 24, to one of the wireless nodes 18. Similarly, the packet 40 may be directed from one of the wireless nodes 18, via the receiver 20 and transmitter 24, to another wireless node 18 or, via the receiver 20 and protocol processor 28, to one of the wired nodes 14.

A feature of the network 10 operation is that a broadcast packet is received by all of the nodes 14 coupled to the wired network 12 and by all of the nodes 18 the wireless network 13. Each of the nodes 14 and 18 thus includes means for synchronizing to and demodulating the data packet 40 and means for comparing an internally maintained network address to the destination address field 40d to determine if the packet is intended for reception by the particular node receiving same.

The packet 40 also includes a data field 40e and typically a data integrity field 40f such as a field containing cyclical redundancy check (CRC) information.

An important feature of the invention is that a packet 40 that is transmitted on the downlink by the transceiver 16 is received by all of the wireless nodes 18. If the packet is addressed to one of the wireless nodes 18 the addressed node 18 retransmits the packet, as it is received, on the uplink channel. The transceiver 16 receives the retransmitted packet and employs the collision detector 30 to determine if a collision has occurred upon the wireless network 13. As employed herein a collision is considered to be a condition wherein two or more of the nodes 12 and/or 18 attempt to simultaneously use the wired network and/or the wireless network to transmit a packet 40.

Figure 3:
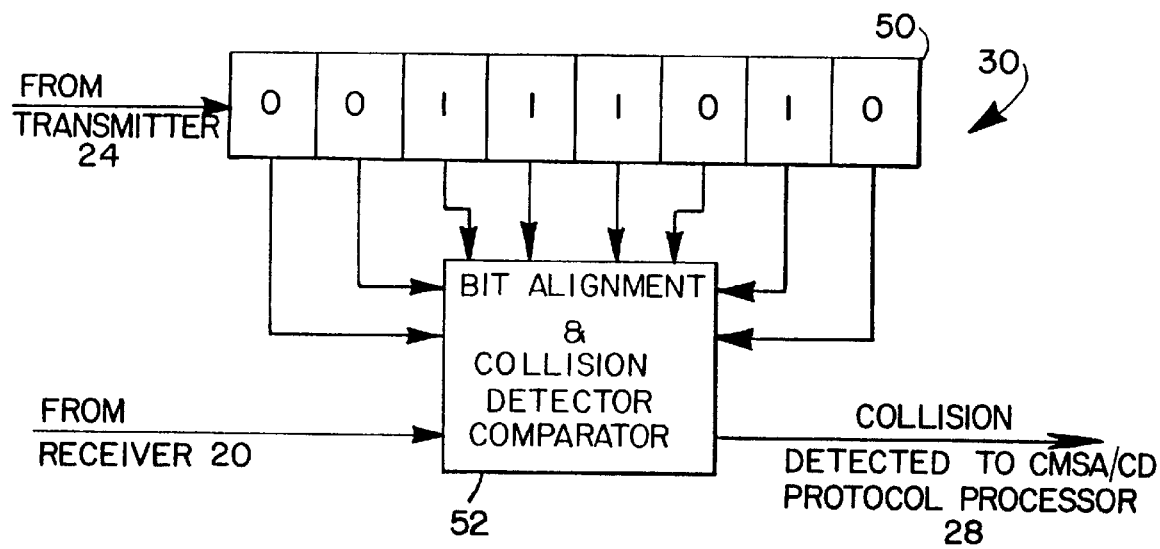
FIG. 3 is a block diagram showing in detail a collision detection functional block that is a feature of the transceiver.

As seen in FIG. 3 the collision detector 30 includes a serial shift register 50 having outputs coupled to a collision detector comparator 52. An input to the shift register is digital data obtained prior to being modulated by the transmitter 24. The collision detector comparator 52 determines an amount of time delay in the wireless network 13 by detecting the occurrence of the received START field 40b of the retransmitted packet and determining an amount of time delay since the transmission of the START field 40b of the originally transmitted packet from the transmitter 24. This difference in time represents the roundtrip propagation delay from the transceiver 16 to the addressed wireless node 18 and also represents the delay between the reception and retransmission of the packet that is experienced within the addressed wireless node 18. This difference in time is employed by the collision comparator detector 32 to align the bits of the transmitted data in the shift register 50 with the real-time received data from the receiver 20 so that a bit-by-bit comparison can be accomplished.

If no signal degradation occurs, or if another wireless node 18 is not attempting to also transmit, the retransmitted bit stream received by the transceiver 16 should be exactly equal to the originally transmitted bit stream. If there is any difference between the two bit streams a collision is assumed to have occurred. For this case the collision detector comparator 52 provides a collision detected signal to the CSMA/CD protocol processor 28. The CSMA/CD protocol processor 28 asserts a collision condition onto the wired network 12.

In accordance with conventional CSMA/CD protocol if any node detects a collision that node asserts a jamming signal onto the network. All nodes detect the jamming signal and immediately stop an in-process transmission or refrain from initiating a transmission. After a period of network quiescence one or more nodes once more attempts to transmit. If another collision occurs the collision is detected and the network is jammed as before. This continues until one of the nodes successfully seizes the network and transmits its' packet of data.

That is, a node 14 on the wired network 12 implements the CSMA/CD protocol by listening for a time when no data is present on the network 12 and then presents its data onto the network 12. As the data is presented to the network 12 the node 14 continues to listen to the network 12 to ensure that the data it is presenting to the network is not corrupted by another node also simultaneously presenting data to the network 12. If a transmitting node 14 detects that the network does not accurately reflect the transmitted data then a collision is said to have occurred.

For the wireless network 13 of FIG. 1 a wireless node 18 that is transmitting a packet 40 at $\lambda_1$ simultaneously receives at $\lambda_2$ the rebroadcast packet from the transceiver 16. If the received packet does not equal the transmitted packet the wireless node 18 detects a collision and, in accordance with the CSMA/CD protocol, jams the wireless network. This jam condition is detected by the protocol processor 28 which in turn asserts a jam signal on the wired network 12. Similarly, a jam condition on the wired network 12 is detected by the protocol processor 28 and is asserted by same via the transmitter 24 on the wireless network.

The jam is provided by each transmitting station that detects either a jam or a collision. The jamming signal is a stream of continuous bits. A collision on the wired network 12 is propagated to the wireless network 13 by all of the transceivers 16. A collision on the wireless network 13 is propagated to the wired network 12 by the affected transceiver 16.

As can be seen, the transceiver 16 provides for linking the wireless nodes 18 to the wired network 12 in a manner that is transparent to the nodes 14 and 18. That is, the nodes are enabled to transmit and receive data packets as though the network were entirely comprised of the wired network 12.

Figure 4:
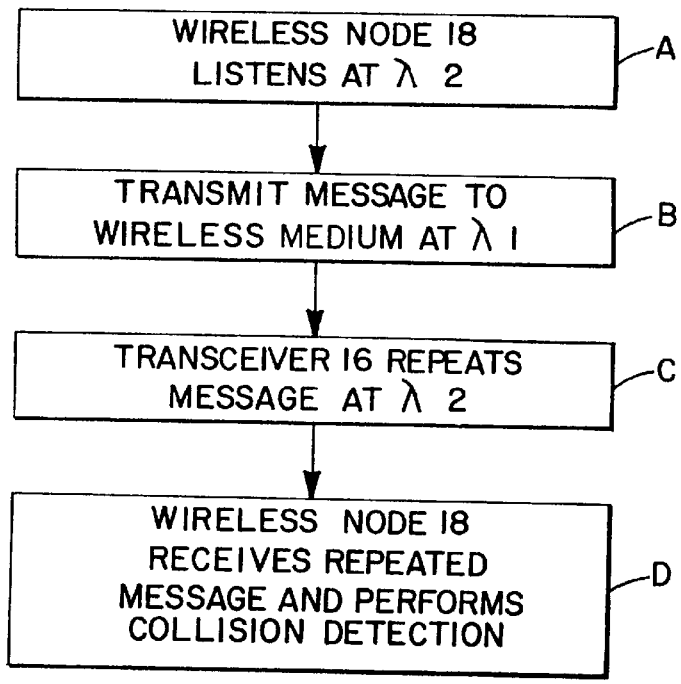
FIG. 4 is a flowchart illustrating a sequence of steps for transferring the packet of data over the wired/wireless CSMA/CD network.

In accordance with the invention, and as illustrated in the flowchart of FIG. 4, this CSMA/CD technique is extended to the wireless network through the use of the two wavelengths $\lambda_1$ and $\lambda_2$. If a wireless node 18 has a packet 40 to send the node 18 monitors or "listens" on wavelength $\lambda_2$ to detect a time when no data is present on the wireless network (Block A). The node 18 then transmits the packet 40 on wavelength $\lambda_1$ (Block B). The transceiver 16 repeats the packet received at wavelength $\lambda_1$ onto the wired network at the wavelength $\lambda_2$ (Block C). The wireless node 18 performs collision detection of its data from another wireless or wired device by receiving the packet on wavelength $\lambda_2$ and comparing the received data to the transmitted data to ensure that they are equal (Block D).

It is noted that wavelength multiplexing is not necessary since the transceiver 16 and wireless node 18 could all emit at the same wavelength. However, wavelength multiplexing avoids problems with delay and other interference problems that may arise if the same wavelength is used.

Mobility of the wireless nodes 18 is addressed by considering that all wireless transceivers 16 within an environment emit at the same wavelength and all wireless nodes 18 emit at the same wavelength. Thus, the wireless nodes 18 maintain a connection to the network 12 using the same wavelengths despite the fact that, by movement, a change in wireless transceivers 16 may occur. If the wireless node 18 moves to another wired network, or from one subnet into another subnet of an office-wide network, then the mechanism of access to the new network or subnet remains the same. However, since the network address of the wireless node 18 may and probably will change network control software and intelligent network bridges may be relied upon to appropriately transfer the data from one network to another.

Advantages provided by the use of the invention for wireless connection to a CSMA/CD network are several. The technical requirements of the network transceiver 16 are minimized in that it functions as a repeater and does not require any significant degree of intelligence. Furthermore, the wired network 12 nodes see no difference from their normal mode of operation and as a result require no changes to either software or hardware. All additional computing required to maintain the wireless network 13 is embodied within the wireless nodes 18, which typically already possess computing devices. The wired network 12 architecture and control protocol thus remain unchanged. The transceiver or transceivers 16 are relatively uncomplex and are manufactured and operated at low cost, making their multiple use cost effective within a large environment, such as an open office or a warehouse. Finally, the use of separate uplink and downlink wavelengths in conjunction with collision detection eliminates interference between the wireless nodes 18.

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method for operating data processing means coupled to a communication network, comprising the steps of:

transmitting a message from a first network node over a wireless medium, the message being addressed to a second network node;

receiving the transmitted message with means for interfacing the wireless network medium to a wired medium having a physical conductor for conveying the message;

retransmitting with the interface means, as the message is received, the received message to the wired medium;

retransmitting with the interface means, as the message is received, the received message to the wireless medium;

receiving the retransmitted message with the first network node; and comparing, with the first network node, the message being transmitted with the received retransmitted message to determine if they are the same and, if not, determining that a collision has occurred.

2. A method as set forth in claim 1 wherein messages transmitted over the wireless medium from the first network node to the interface means are transmitted at a first wavelength, and wherein messages transmitted over the wireless medium from the interface means to the first network node are transmitted at a second wavelength that differs from the first wavelength, and wherein the first and the second wavelengths are each greater than 700 nanometers.

3. A method as set forth in claim 1 wherein messages transmitted to the wired network and to the wireless network are transmitted in accordance with a CSMA/CD protocol.

4. A method as set forth in claim 1 wherein if it is determined that a collision has occurred, the method includes a further step of asserting a collision detected condition upon the wired medium and upon the wireless medium.

5. A method for operating data processing means coupled to a communication network, comprising the steps of:

transmitting a message from a first network node over a wired medium having a physical conductor for conveying the message, the message being addressed to a second network node;

receiving the transmitted message with means for interfacing the wired medium to a wireless medium;

transmitting with the interface means, as the message is received, the received message to the wireless medium;

receiving the message over the wireless medium with at least one network node;

if the message is addressed to a network node that receives the message over the wireless medium, retransmitting the received message with the addressed node over the wireless medium, the message being retransmitted as received;

receiving the retransmitted message with the interface means; and comparing, with the interface means, the message being transmitted with the received retransmitted message to determine if they are the same and, if not, determining that a collision has occurred.

6. A method as set forth in claim 5 wherein messages transmitted over the wireless medium from the network node to the interface means are transmitted at a first wavelength, and wherein messages transmitted over the wireless medium from the interface means to the network node are transmitted at a second wavelength that differs from the first wavelength, and wherein the first and the second wavelengths are each greater than 700 nanometers.

7. A method for operating data processing means coupled to a communication network, comprising the steps of:

transmitting a message from a first network node over a wired medium having a physical conductor for conveying the message, the message being addressed to a second network node;

receiving the transmitted message with means for interfacing the wired medium to a wireless medium;

transmitting with the interface means, as the message is received, the received message to the wireless medium;

receiving the message over the wireless medium with at least one network node;

if the message is addressed to a network node that receives the message over the wireless medium, retransmitting the received message with the addressed node over the wireless medium, the message being retransmitted as received;

receiving the retransmitted message with the interface means; and comparing, with the interface means, the message being transmitted with the received retransmitted message to determine if they are the same and, if not, determining that a collision has occurred;

wherein the step of comparing includes the initial steps of determining an amount of delay between the transmission of the message to the wireless medium and the reception of the retransmitted message; and aligning transmitted bits with corresponding received bits so that the bits can be compared.

8. A method as set forth in claim 5 wherein messages transmitted to the wired network and to the wireless network are transmitted in accordance with a CSMA/CD protocol.

9. A method as set forth in claim 5 wherein if it is determined that a collision has occurred, the method includes a further step of asserting a collision detected condition upon the wired medium and upon the wireless medium.

10. Apparatus for interfacing a wired communications network to a wireless communications network each of which operates with a same communications protocol, comprising:

means for bidirectionally interfacing to the wired medium for transmitting messages to the wired medium and for receiving messages from the wired medium, the wired medium having a physical conductor for conveying the message;

means for bidirectionally interfacing to the wireless medium for transmitting messages to the wire less medium and for receiving messages from the wireless medium;

means for bidirectionally routing messages received from the wired medium to the wireless medium and for routing messages received from the wireless medium to the wired medium; and means, responsive to a message transmitted to the wireless medium, for receiving a rebroadcast message from the wireless medium and for comparing the transmitted message to the received rebroadcast message to determine if a collision has occurred.

11. Apparatus as set forth in claim 10 wherein the means for bidirectionally interfacing to the wireless medium includes means for receiving optical radiation having a first wavelength and for transmitting optical radiation at a second wavelength that differs from the first wavelength.

12. Apparatus as set forth in claim 11 wherein the first and the second wavelengths are each longer than 700 nm.

13. Apparatus for interfacing a wired communications network to a wireless communications network each of which operates with a same communications protocol, comprising:

means for bidirectionally interfacing to the wired medium for transmitting messages to the wired medium and for receiving messages from the wired medium, the wired medium having a physical conductor for conveying the message;

means for bidirectionally interfacing to the wireless medium for transmitting messages to the wireless medium and for receiving messages from the wireless medium;

means for bidirectionally routing messages received from the wired medium to the wireless medium and for routing messages received from the wireless medium to the wired medium; and means, responsive to a message transmitted to the wireless medium, for receiving a rebroadcast message from the wireless medium and for comparing the transmitted message to the received rebroadcast message to determine if a collision has occurred;

wherein said comparing means is comprised of,
means for determining an amount of delay between the transmission of the message to the wireless medium and the reception of the rebroadcast message;
means for temporarily storing at least a portion of the transmitted message; and
means, responsive to the operation of the delay determining means, for aligning the stored transmitted message with the received rebroadcast message so that they can be correctly compared one to another.

14. Apparatus as set forth in claim 10 wherein messages transmitted to the wired network and to the wireless network are transmitted in accordance with a CSMA/CD protocol.

15. Apparatus as set forth in claim 10 wherein the comparing means includes means, coupled to the means for bidirectionally interfacing to the wired medium and also to the means for bidirectionally interfacing to the wireless medium, for asserting a collision detected condition upon the wired medium and upon the wireless medium.

16. A data communications network that operates in accordance with a Carrier Sense Multiple Access/Collision Detection (CSMA/CD) technique, comprising:
a first network portion comprising a physical communications medium having at least one first device bidirectionally interfaced to the physical communications medium;
a second network portion comprising a wireless communications medium having at least one second device bidirectionally interfaced to the wireless communications medium;
means for interfacing said first network portion to said second network portion, said interfacing means comprising means for bidirectionally interfacing to the physical communications medium for transmitting messages to the physical communications medium and for receiving messages from the physical communications medium; means for bidirectionally interfacing to the wireless communications medium for transmitting, with a first wavelength, messages to the wireless medium and for receiving, with a second wavelength, messages from the wireless communications medium; means for coupling a message received from the wireless communications medium to said means for transmitting to the wireless communications medium for re-transmitting to the wireless communications medium a message as the message is received from the wireless communications medium; and means for bidirectionally routing messages received from the physical communications medium to the wireless communications medium and for routing messages received from the wireless communications medium to the physical communications medium; wherein
said at least one second device that is interfaced to the wireless communications medium is comprised of means for bidirectionally interfacing to the wireless communications medium for transmitting, with the second wavelength, messages to the wireless medium and for receiving, with the first wavelength, messages from the wireless communications medium; means for coupling a message received from the wireless communications medium to said means for transmitting to the wireless communications medium for re-transmitting to the wireless communications medium a message as the message is received from the wireless communications medium; and means, responsive to a message transmitted to the wireless communications medium, for receiving a corresponding re-transmitted message over the wireless communications medium from said interfacing means and for comparing the transmitted message to the received re-transmitted message to determine if a collision has occurred on the wireless communications medium; and wherein
said interfacing means includes means, responsive to a message transmitted to the wireless communications medium, for receiving a corresponding re-transmitted message over the wireless communications medium from said second device and for comparing the transmitted message to the received re-transmitted message to determine if a collision has occurred on the wireless communications medium.

17. A data communications network that operates in accordance with a Carrier Sense Multiple Access/Collision Detection (CSMA/CD) technique, comprising:
a first network portion comprising a physical communications medium having at least one first device bidirectionally interfaced to the physical communications medium;
a second network portion comprising a wireless communications medium having at least one second device bidirectionally interfaced to the wireless communications medium;
means for interfacing said first network portion to said second network portion, said interfacing means comprising means for bidirectionally interfacing to the physical communications medium for transmitting messages to the physical communications medium and for receiving messages from the physical communications medium; means for bidirectionally interfacing to the wireless communications medium for transmitting, with a first wavelength, messages to the wireless medium and for receiving, with a second wavelength, messages from the wireless communications medium; means for coupling a message received from the wireless communications medium to said means for transmitting to the wireless communications medium for re-transmitting to the wireless communications medium a message as the message is received from the wireless communications medium; and means for bidirectionally routing messages received from the physical communications medium to the wireless communications medium and for routing messages received from the wireless communications medium to the physical communications medium; wherein
said at least one second device that is interfaced to the wireless communications medium is comprised of means for bidirectionally interfacing to the wireless communications medium for transmitting, with the second wavelength, messages to the wireless medium and for receiving, with the first wavelength, messages from the wireless communications medium; means for coupling a message received from the wireless communications medium to said means for transmitting to the wireless communications medium for re-transmitting to the wireless communications medium a message as the message is received from the wireless communications medium; and means, responsive to a message transmitted to the wireless communications medium, for receiving a corresponding re-transmitted message over the wireless communications medium from said interfacing means and for comparing the transmitted message to the received re-transmitted message to determine if a collision has occurred on the wireless communications medium; and wherein said interfacing means includes means, responsive to a message transmitted to the wireless communications medium, for receiving a corresponding re-transmitted message over the wireless communications medium from said second device and for comparing the transmitted message to the received re-transmitted message to determine if a collision has occurred on the wireless communications medium; wherein each of said comparing means is comprised of:

means for determining an amount of delay between the transmission of the message to the wireless communications medium and the reception of the re-transmitted message from the wireless communications medium;

means for temporarily storing at least a portion of the transmitted message; and means, responsive to the operation of the delay determining means, for aligning the stored transmitted message with the received re-transmitted message so that they can be correctly compared one to another.

18. A data communications network as set forth in claim 16 wherein each of said first and said second wavelengths are within a band of wavelengths associated with infrared radiation.

* * * * *